US008482887B2

(12) United States Patent
Li et al.

(10) Patent No.: US 8,482,887 B2
(45) Date of Patent: Jul. 9, 2013

(54) GROUND-FAULT CIRCUIT INTERRUPTER WITH CIRCUIT CONDITION DETECTION FUNCTION

(75) Inventors: Cheng Li Li, Shanghai (CN); Guolan Yue, Shanghai (CN)

(73) Assignee: Bingham McCutchen LLP, Boston, MA (US)

( * ) Notice: Subject to any disclaimer, the term of this patent is extended or adjusted under 35 U.S.C. 154(b) by 0 days.

(21) Appl. No.: 13/290,637

(22) Filed: Nov. 7, 2011

(65) Prior Publication Data

US 2012/0050055 A1 Mar. 1, 2012

Related U.S. Application Data

(63) Continuation of application No. 12/098,540, filed on Apr. 7, 2008, now Pat. No. 8,054,590.

(30) Foreign Application Priority Data

Dec. 7, 2007 (CN) .......................... 2007 1 0171960

(51) Int. Cl.
*H02H 3/00* (2006.01)
*H02H 9/08* (2006.01)

(52) U.S. Cl.
USPC .................... 361/49; 361/42; 361/45; 361/46

(58) Field of Classification Search
USPC .......................................... 361/42, 45, 46, 49
See application file for complete search history.

(56) References Cited

U.S. PATENT DOCUMENTS 3,766,434 A 10/1973 Sherman
4,051,544 A 9/1977 Vibert
4,159,499 A 6/1979 Bereskin
4,421,959 A 12/1983 Chen et al.
4,442,470 A 4/1984 Misencik
4,595,894 A 6/1986 Doyle et al.
4,616,117 A 10/1986 Kleine
4,618,907 A 10/1986 Leopold
5,341,266 A * 8/1994 Grove ............................ 361/45
5,418,678 A 5/1995 McDonald
5,546,266 A 8/1996 MacKenzie et al.
5,594,398 A 1/1997 Marcou et al.
5,600,524 A 2/1997 Neiger et al.
5,831,395 A 11/1998 Mortimer et al.
6,040,967 A 3/2000 DiSalvo
6,246,558 B1 6/2001 DiSalvo et al.
6,282,070 B1 8/2001 Ziegler et al.
6,381,112 B1 4/2002 DiSalvo
6,437,953 B2 8/2002 DiSalvo et al.

(Continued)

*Primary Examiner* — Rexford Barnie
*Assistant Examiner* — Zeek V Kitov
(74) *Attorney, Agent, or Firm* — Bingham McCutchen LLP

(57) ABSTRACT

A GFCI device with circuit condition detection function includes a leakage current detection circuit, a disconnect mechanism, a reset mechanism, a circuit condition detection and control circuit, and a selection switch. The disconnect mechanism includes a first SCR controlled by the leakage current detection circuit. The circuit condition detection and control circuit includes a first control circuit and a second control circuit. When the first control circuit is connected to an anode of the first SCR by the selection switch, it provides an intermittent simulated leakage current to the leakage current detection circuit, and the leakage current detection circuit provides a trigger signal for a control gate of the first SCR, so that the first control circuit generates an intermittent simulated leakage current. When the leakage current detection circuit is not operational to generate the trigger signal, the first control circuit generates a control signal to disable the GFCI device.

6 Claims, 7 Drawing Sheets

U.S. PATENT DOCUMENTS

| | | | |
|---|---|---|---|
| 6,646,838 | B2 | 11/2003 | Ziegler et al. |
| 6,657,834 | B2 | 12/2003 | DiSalvo |
| 6,671,145 | B2 | 12/2003 | Germain et al. |
| 6,693,779 | B2 | 2/2004 | DiSalvo |
| 6,717,782 | B2 | 4/2004 | DiSalvo et al. |
| 6,720,872 | B1 | 4/2004 | Engel et al. |
| 6,734,769 | B1 | 5/2004 | Germain et al. |
| 6,771,152 | B2 | 8/2004 | Germain et al. |
| 6,813,126 | B2 | 11/2004 | DiSalvo et al. |
| 6,828,886 | B2 | 12/2004 | Germain et al. |
| 6,864,766 | B2 | 3/2005 | DiSalvo et al. |
| 6,864,769 | B2 | 3/2005 | Germain et al. |
| 6,873,231 | B2 | 3/2005 | Germain et al. |
| 6,900,972 | B1 | 5/2005 | Chan et al. |
| 6,937,451 | B2 | 8/2005 | Ulrich et al. |
| 6,944,001 | B2 | 9/2005 | Ziegler et al. |
| 6,954,125 | B2 | 10/2005 | Wu et al. |
| 6,975,192 | B2 | 12/2005 | Disalvo |
| 6,975,492 | B2 | 12/2005 | DiSalvo |
| 6,982,856 | B2 | 1/2006 | Bernstein |
| 7,009,473 | B2 | 3/2006 | Zhang |
| 7,031,125 | B2 | 4/2006 | Germain et al. |
| 7,042,688 | B2 | 5/2006 | Chan et al. |
| 7,049,910 | B2 | 5/2006 | Campolo et al. |
| 7,088,205 | B2 | 8/2006 | Germain et al. |
| 7,098,761 | B2 | 8/2006 | Germain et al. |
| 7,154,718 | B1 | 12/2006 | Finlay, Sr. et al. |
| 7,164,564 | B1 | 1/2007 | Finlay, Sr. et al. |
| 7,173,799 | B1 | 2/2007 | Weeks et al. |
| 7,184,250 | B2 | 2/2007 | Bonilla et al. |
| 7,195,500 | B2 | 3/2007 | Huang et al. |
| 7,212,386 | B1 | 5/2007 | Finlay, Sr. et al. |
| 7,227,435 | B2 | 6/2007 | Germain et al. |
| 7,253,629 | B1 | 8/2007 | Richards et al. |
| 7,256,973 | B1 | 8/2007 | Radosavljevic et al. |
| 7,265,956 | B2 | 9/2007 | Huang |
| 7,271,987 | B1 | 9/2007 | Zhang et al. |
| 7,289,306 | B2 | 10/2007 | Huang et al. |
| 7,295,415 | B2 | 11/2007 | Huang et al. |
| 7,315,437 | B2 | 1/2008 | Bonilla et al. |
| 7,443,309 | B2 | 10/2008 | Baldwin et al. |
| 7,492,558 | B2 | 2/2009 | Germain et al. |
| 7,498,909 | B2 | 3/2009 | Zhang et al. |
| 7,525,441 | B2 | 4/2009 | Zhang et al. |
| 7,612,973 | B2 | 11/2009 | Germain |
| 2004/0021996 | A1 | 2/2004 | Wu et al. |
| 2004/0027740 | A1 | 2/2004 | Huang et al. |
| 2004/0037018 | A1 | 2/2004 | Kim |
| 2004/0070897 | A1 | 4/2004 | Wu et al. |
| 2005/0264383 | A1 | 12/2005 | Zhang |
| 2006/0139132 | A1 | 6/2006 | Porter et al. |
| 2008/0186642 | A1 | 8/2008 | Campolo et al. |
| 2009/0147418 | A1 | 6/2009 | Li et al. |

* cited by examiner

GROUND-FAULT CIRCUIT INTERRUPTER WITH CIRCUIT CONDITION DETECTION FUNCTION

CROSS-REFERENCE TO RELATED APPLICATIONS

This application is a continuation of U.S. patent application Ser. No. 12/098,540, filed on Apr. 7, 2008, which claims foreign priority benefits under 35 U.S.C. §119(a)-(d) from China Patent Application No. 200710171960.4, filed Dec. 7, 2007, which is incorporated by reference in its entirety.

BACKGROUND OF THE INVENTION

1. Field of the Invention

The present invention relates to ground-fault circuit interrupter (GFCI) devices, and more particularly relates to an improved GFCI device with a reverse wiring protection function and a circuit condition detection function.

2. Description of the Related Art

To ensure the safety of home electrical appliances and other electrical devices, ground-fault circuit interrupters (GFCI) with a reverse wiring protection function and circuit leakage current protection function have been introduced. U.S. Pat. No. 7,019,952 (based on China utility model application), which is incorporated by reference in its entirety, describes a GFCI device. In this device, if the GFCI is incorrectly wired, i.e., if the line power is connected to the output side of the GFCI, the GFCI can prevent the electrical connection between the output side and the input side as well as between the output side and the output plugs, so that no power is outputted to the output side or the plug. Only when the GFCI is correctly wired, i.e., when the line power is connected to the input side of the GFCI, can the device electrically connect the input side with the output side and the output plugs.

Although conventional GFCI devices have a reverse wiring protection function, these devices may lose is leakage current protection function under certain conditions, such as when the leakage current amplifying circuit (IC) is not property functioning. These cause hidden safety problems. Therefore, it is desired to provide GFCI devices that have a circuit condition detection function.

SUMMARY OF THE INVENTION

Conventional GFCI devices commonly includes a leakage current detection circuit and an electro-magnetic disconnect mechanism, where the electro-magnetic disconnect mechanism can be activated by a control signal generated by the leakage current detection circuit, accomplishing a leakage current protection function. However, under certain conditions, such as when certain elements of the leakage currently detection circuit are defective or malfunctioning, the leakage current detection circuit cannot properly perform the detection function, and the GFCI device loses its intended protection effect.

An object of the present invention is to provide a GFCI receptacle device having a circuit condition detection function.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a GFCI device with circuit condition detection function, which includes a leakage current detection circuit, an electro-magnetic disconnect mechanism, a reset mechanism, a circuit condition detection and control circuit, and a selection switch. The electro-magnetic disconnect mechanism includes a first silicon-control rectifier (SCR), and its action is controlled by the leakage current detection circuit. The reset mechanism includes a reset button, which is moveable between a first position and a second position, wherein when the reset button is in the second position, the electro-magnetic disconnect mechanism can be activated by the leakage current detection circuit to move the reset button to the first position. The circuit condition detection and control circuit includes a first control circuit and a second control circuit. The first control circuit can be selectively electrically connected to an anode of the first SCR via the selection switch; when so connected, the first control circuit provides a simulated leakage current to the leakage current detection circuit, and the leakage current detection circuit provides a trigger signal for a control gate of the first SCR. When the leakage current detection circuit is operational to generate the trigger signal, the first control circuit generates the simulated leakage current intermittently; when the leakage current detection circuit is not operational to generate the trigger signal, the first control circuit provides a control signal to the second control circuit. The second control circuit generates a signal in response to the control signal from the first control circuit.

The GFCI device further includes a short circuit protection element (such as a fuse) and a circuit condition indicator (such as an LED). The short circuit protection element is operable to electrically disconnect power to the leakage current detection circuit in response to the signal from the second control circuit. The circuit condition indicator indicates the conditions of the short circuit protection element to allow a user to determine whether the GFCI device is property functioning.

When the first control circuit is electrically connected to the anode of the first SCR via the selection switch, the circuit condition detection and control circuit periodically detects the condition of the leakage current detection circuit. If the leakage current detection circuit malfunctions and cannot generate the trigger signal, the circuit condition detection and control circuit generates a signal to disable the leakage current detection circuit. During the detection process, a simulated leakage current path including the first control circuit provides a simulated leakage current to the leakage current detection circuit; during this process, a current flows through the electro-magnetic disconnect mechanism, but the current is insufficient to cause the electro-magnetic disconnect mechanism to be activated. The first and second control circuits can be implemented by a photo coupler and an SCR, respectively. The disabling of the leakage current detection circuit can be accomplished by blowing a short circuit protection element such as a fuse. The circuit condition indicator can be implemented by an LED or a beeper.

In a first embodiment, reverse wiring protection is facilitated by the electro-magnetic disconnect mechanism; in a second embodiment, reverse wiring protection is facilitated by a separate relay which allows the reset mechanism to close the reset switches when the GFCI is correctly wired or disallows it when the GFCI is reversely wired.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1A:
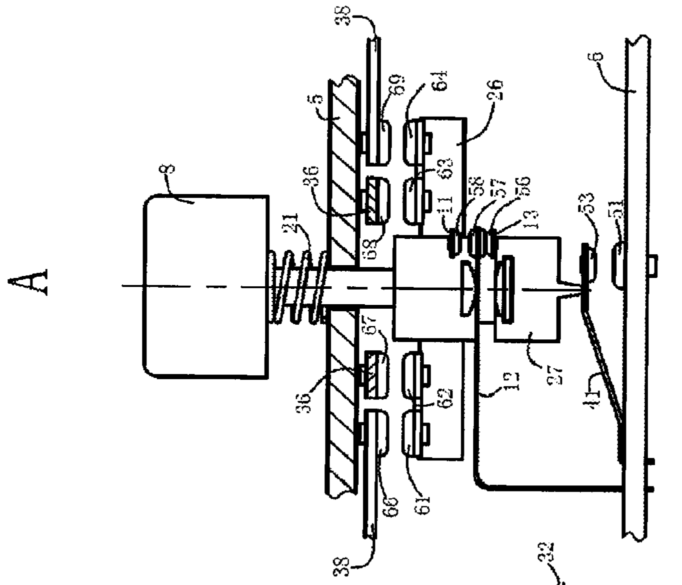
FIGS. 1A and 1B are two orthogonal cross-sectional views of a GFCI device according to a first embodiment of the present invention in a tripped (disconnected) state.
Figure 1B:
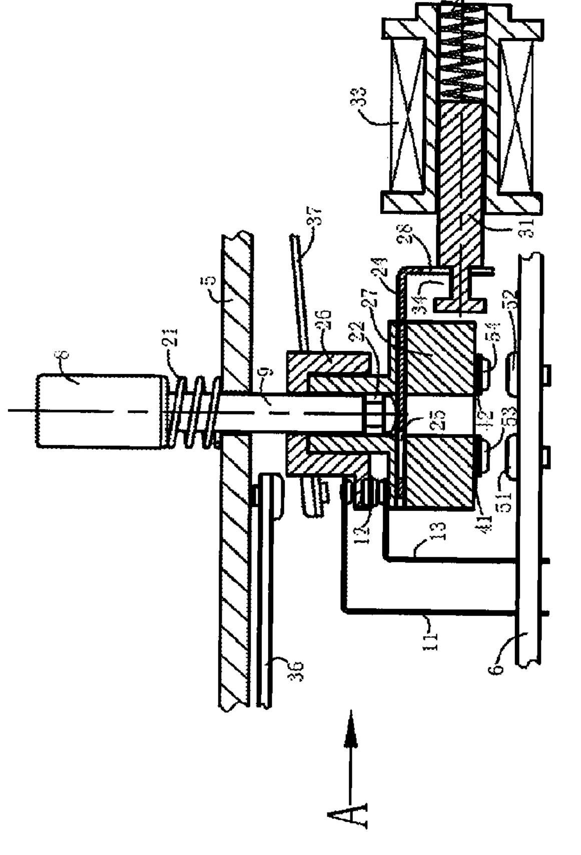
Figure 2A:
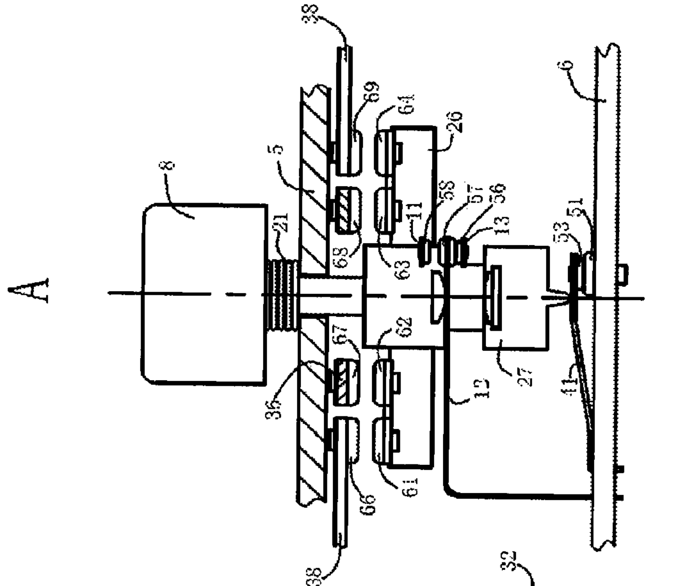
FIGS. 2A and 2B are two orthogonal cross-sectional views of the GFCI device according to the first embodiment of the present invention when the reset button is depressed.
Figure 2B:
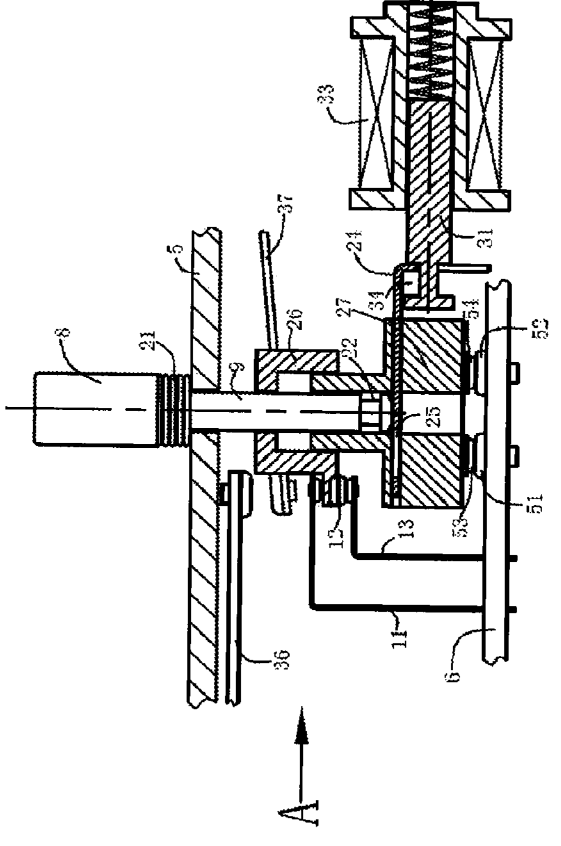

Embodiments of the present invention are described below with reference to the drawings. The invention is not limited to these embodiments.

FIGS. 1A-4 illustrate the first embodiment of the present invention.

As shown in these figures, a pair of input-side conductors 36 is disposed below a frame 5 and is provided with contact terminals 67, 68 thereon. A pair of insertion output conductors 38 are disposed adjacent the pair of input-side conductors 36 and are provided with contact terminals 66, 69 thereon. A pair of output-side conductors 37 is disposed below the input-side conductors 36 and the insertion conductors 38 and is provided with contact terminals 61, 62, 63 and 64 thereon. The contact terminals 61, 62, 63 and 64 correspond in position with the contact terminals 66, 67, 68 and 69, respectively. The contact terminals 61 and 62 are electrically connected; the contact terminals 63 and 64 are electrically connected. These contact terminals constitute the reset switches shown in FIG. 4.

A reset button 8 is disposed above the frame 5. A reset shaft 9 is mechanically coupled to the reset button 8, and passes through the frame 5. A reset spring 21 is disposed around the reset shaft 9 between the frame 5 and the reset button 8. A lifting block 26 is disposed below the frame 5 and can lift the pair of output-side conductors 37. A disconnect member 27 is disposed below the lifting block 26. Both the lifting block 26 and the disconnect member 27 have a center through hole through which the reset shaft 9 passes.

On the side of the lifting block 26 are three conductors 11, 12 and 13 electrically connected to a circuit board 6. A contact terminal 58, a double-sided contact terminal 57 and a contact terminal 56 are provided at the end of the conductors 11, 12 and 13, respectively. The contact terminals 58, 57 and 56 are aligned in the vertical direction, with the contact terminal 58 at the top, the contact terminal 57 in the middle, and the contact terminal 56 at the bottom. These three contact terminals 58, 57 and 56 constitute the selection switch SW3 shown in FIG. 4. The horizontal arm of the conductor 12 is clamped between two horizontal protrusions of the lifting block 26 and moves with them. Contact terminals 57 and 56 are in contact when the GFCI is in the tripped (disconnected) state. When the lifting block 26 is lifted, the conductor 12 is lifted to connect the contact terminals 57 and 58 with each other while disconnecting the contact terminals 57 and 56 from each other.

Inserted in the disconnect member 27 is an L-shaped locking member 24 which has a horizontal arm inserted through the disconnect member 27. The horizontal arm of the L-shaped locking member 24 has a hole 25, and the L-shaped locking member 24 can move horizontally between a position where the hole 25 is aligned with the center through hole of the disconnect member 27 and a position where the hole 25 is not aligned with the center through hole of the disconnect member 27.

Disposed on one side of the L-shaped locking member 24 is a disconnect assembly which includes a coil 33 (corresponding to the solenoid SOL in FIG. 4), a disconnect spring 32 and a plunger (or core) 31. One end of the plunger 31 is mechanically coupled to the disconnect spring 32, and the spring 32 and the plunger 31 are disposed within the coil 33. Another end of the plunger has a neck portion 34 mechanically coupled to a hole or slot 28 on the vertical arm of the L-shaped locking member 24. When a sufficiently large current flows through the coil 33, the plunger 31 is moved horizontally by the magnetic force generated by the coil 33, thereby moving the L-shaped locking member 24 correspondingly.

Below the disconnect member 27 are two switches corresponding to switches SW1 and SW2 in FIG. 4, which include two resilient metal plates 41 and 42 electrically connected to the circuit board 6, contact terminals 53 and 54 disposed at the end of the resilient metal plates 41 and 42, and corresponding contact terminals 51 and 52 on the circuit board 6. When the disconnect member 27 is pressed down, contact terminals 53 and 51 are electrically connected, and contact terminals 54 and 52 are electrically connected.

The reset button 8, reset shaft 9 and reset spring 21 form a reset mechanism. The disconnect assembly (coil 33, spring 32 and plunger 31), the lifting block 26, the disconnect member 27 and the L-shaped locking member 24 form an electro-magnetic disconnect mechanism. A silicon-control rectifier SCR1 connected in series with the coil 33 via the selection switch SW3 (see FIG. 4) is also a part of the electro-magnetic disconnect mechanism. The electro-magnetic disconnect mechanism is actuated by the signal at the control gate of the SCR1 (when the selection switch SW1 connects the SOL to the SCR1). These mechanisms cooperate with each other and with other parts of the GFCI device to trip (disconnect) and reset (connect) the GFCI device as described in more detail below.

Figure 4:
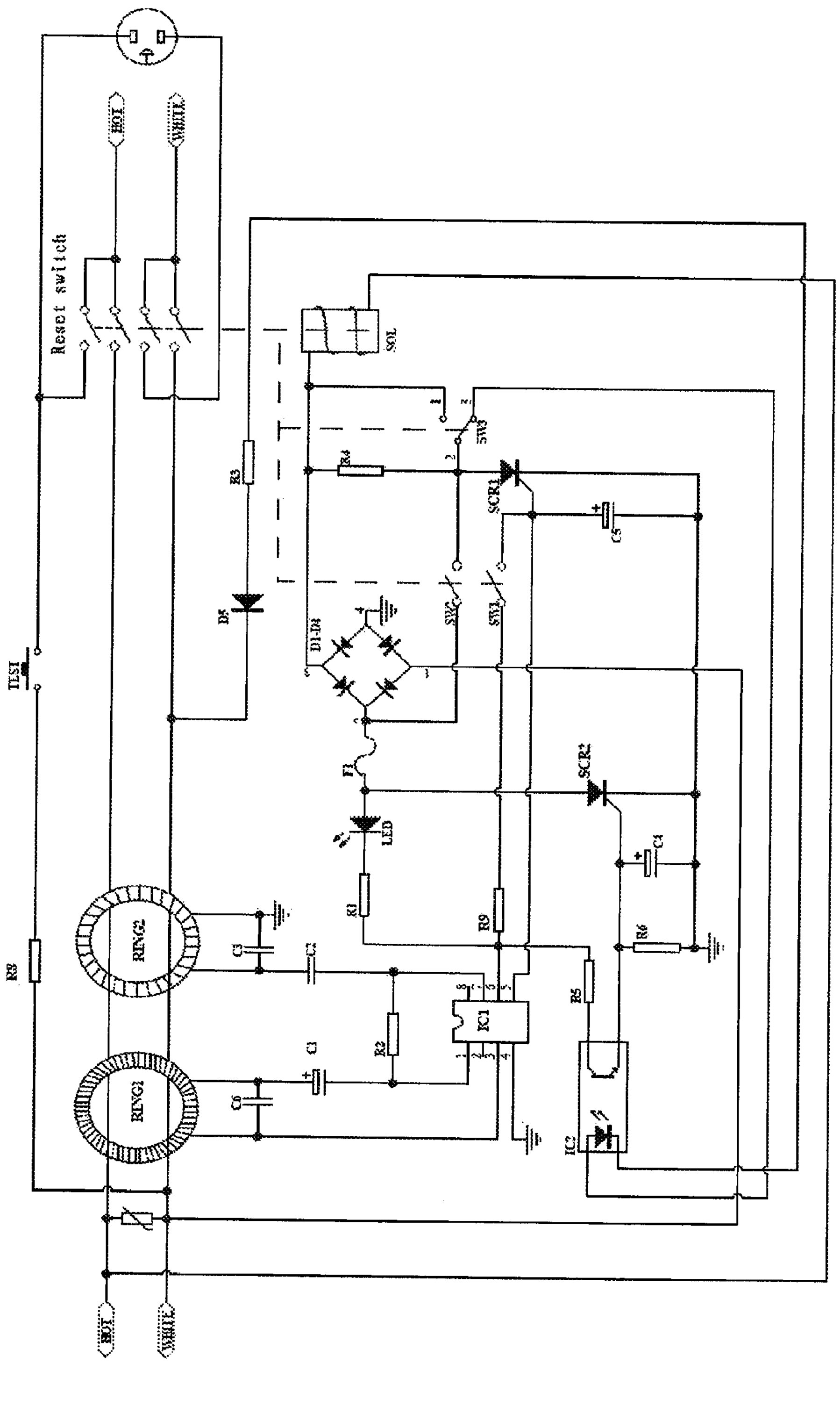
FIG. 4 is a circuit diagram of the GFCI device according to the first embodiment of the present invention.
Figure 5A:
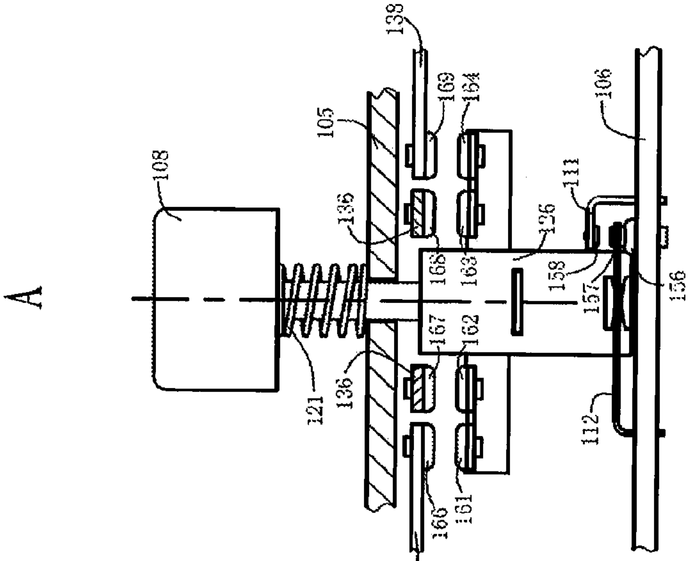
FIGS. 5A and 5B are two orthogonal cross-sectional views of a GFCI device according to a second embodiment of the present invention in a tripped (disconnected) state.
Figure 5B:
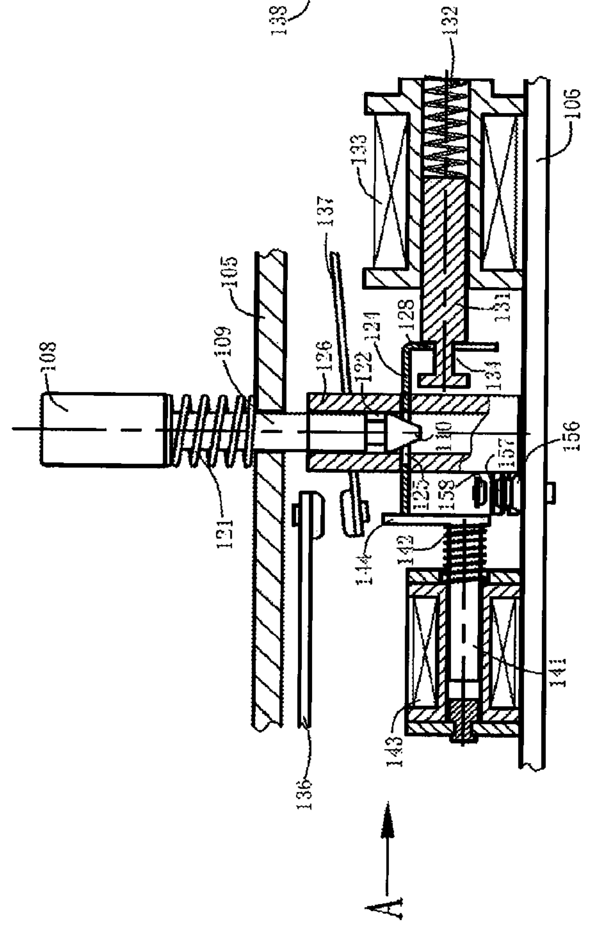

In the circuit diagram shown in FIG. 4, a circuit condition detection and control circuit includes a first control circuit which includes a photo coupler IC2 and a second control circuit which includes a silicon-control rectifier SCR2.

Referring to FIGS. 1A-4, in the disconnected (tripped) state, the input-side conductors 36, the insertion output conductors 38 and the output-side conductors 37 are electrically disconnected from each other. During installation, if the line power is connected to the output side of the GFCI by mistake, and the reset button 8 is pressed down, the reset shaft presses down on the horizontal arm of the L-shaped locking member 24, which pushes the disconnect member 27 down. This in turn presses down the resilient metal plates 41, 42, closing switches SW1, SW2 (see FIGS. 2A and 2B). Because the input side and output side are electrically disconnected from each other, the electric circuitry connected to the input side is not energized, the silicon-control rectifier SCR1 does not conduct, and sufficient current does not flow through the coil 33. Thus, the L-shaped locking member 24 does not move laterally. At this time, when the user releases the press on the reset button and the reset button 8 is urged upwards by the reset spring 21, the disconnect member 27 is pushed by the resilient metal plates 41, 42 back to its initial position (i.e. the tripped position, see FIGS. 1A and 1B). As a result, the input-side conductors 36 and the insertion output conductors 38 are still disconnected from the output-side conductors 37, and no power is outputted to the input side and the insertion output (the plug). This accomplishes the reverse-wiring protection function.

Still referring to FIGS. 1A-4, when the input side of the GFCI is correctly connected to the line power and the input-side conductors 36 are disconnected from the insertion output conductors 38 and the output-side conductors 37 (i.e. a tripped state), the GFCI operates as follows. In this state, the light emitting diode LED emits light. Contact terminals 56 and 57 are in electrical contact, i.e., points 2 and 3 of the switch SW3 are connected. Thus, the solenoid SOL, resistor R4, switch SW3, the primary stage of the photo coupler IC2 (i.e. the light emitting side of the photo coupler), resistor R3 and diode D5 form a current path between the hot and white terminals on the input side. The current in this current path (hereinafter referred to as the simulated leakage current path) generates a simulated leakage current for the detector ring RING1, which detects this leakage current and provides an input signal to the integrated circuit IC1, causing IC1 to output a trigger signal at its pin 5. This trigger signal is applied to the control gate of the silicon-controlled rectifier SCR1 and triggers the SCR1 to become conductive, which shorts the simulated leakage current (by shorting point 2 to ground). As the simulated leakage current for the detector ring RING1 is no longer present, IC1 stops generating the output trigger signal at pin 5, and SCR1 becomes non-conductive. At this time, the simulated leakage current path is again formed by the solenoid SOL, resistor R4, switch SW3, the primary stage of the photo coupler IC2, resistor R3 and diode D5. As such, the above-described actions are repeated with the alternating cycle of the AC current. When the primary stage (the light emitting element) of the photo coupler IC2 has intermittent current flow through it in the manner described above, the light emitting element emits light intermittently, and the secondary stage of the photo coupler IC2 (i.e. the photo sensitive element) is not activated and does not conduct. In this state, the GFCI is tripped and the leakage current detection circuit is working property, and the GFCI is ready to be reset at any time.

If, however, when in the tripped state the leakage current detection circuit including RING1 and IC1 malfunctions and cannot generate a proper trigger signal at pin 5, SCR1 will not conduct at all. As a result, the simulated leakage current path has a continuous current flow through it. As the primary stage of the photo coupler IC2 continuously emits light, the secondary stage of the photo coupler IC2 (the light sensitive element) is activated and becomes conductive. As a result, a trigger voltage is applied to the gate of the silicon-control rectifier SCR2, causing SCR2 to be conductive. This in turn causes the fuse F1 (a short circuit protection element) to be burnt out, and the light emitting diode LED (a circuit condition indicator) no longer emits light. This is the end of life state of the GFCI. In this state, the circuit IC 1 is no longer powered by the diode bridge D1-D4, and the GFCI cannot be reset. As an alternative to the LED, the circuit condition indicator may be implemented by a beeper or other suitable indicators. As an alternative to the fuse Fl, the short circuit protection element may be implemented by a fusible resistor or other suitable fusible links.

Figure 3A:
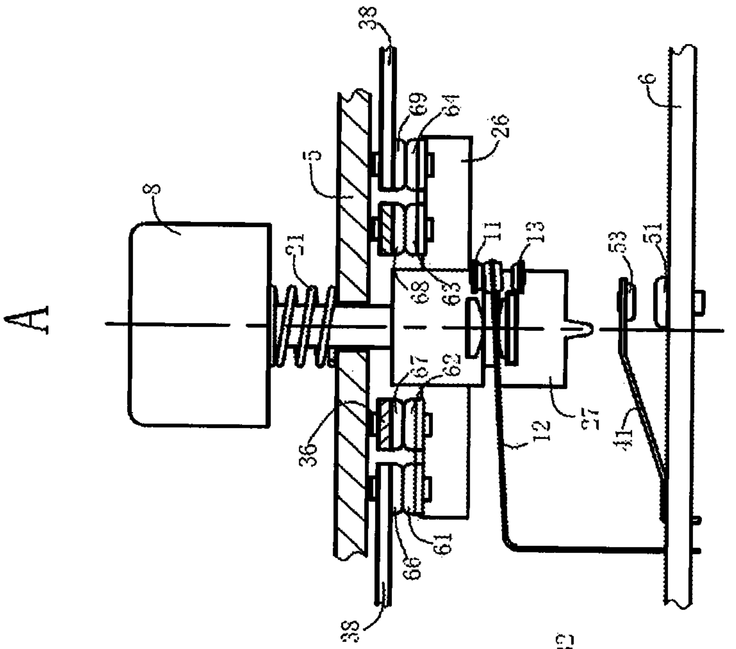
FIGS. 3A and 3B are two orthogonal cross-sectional views of the GFCI device according to the first embodiment of the present invention in a reset (connected) state.
Figure 3B:
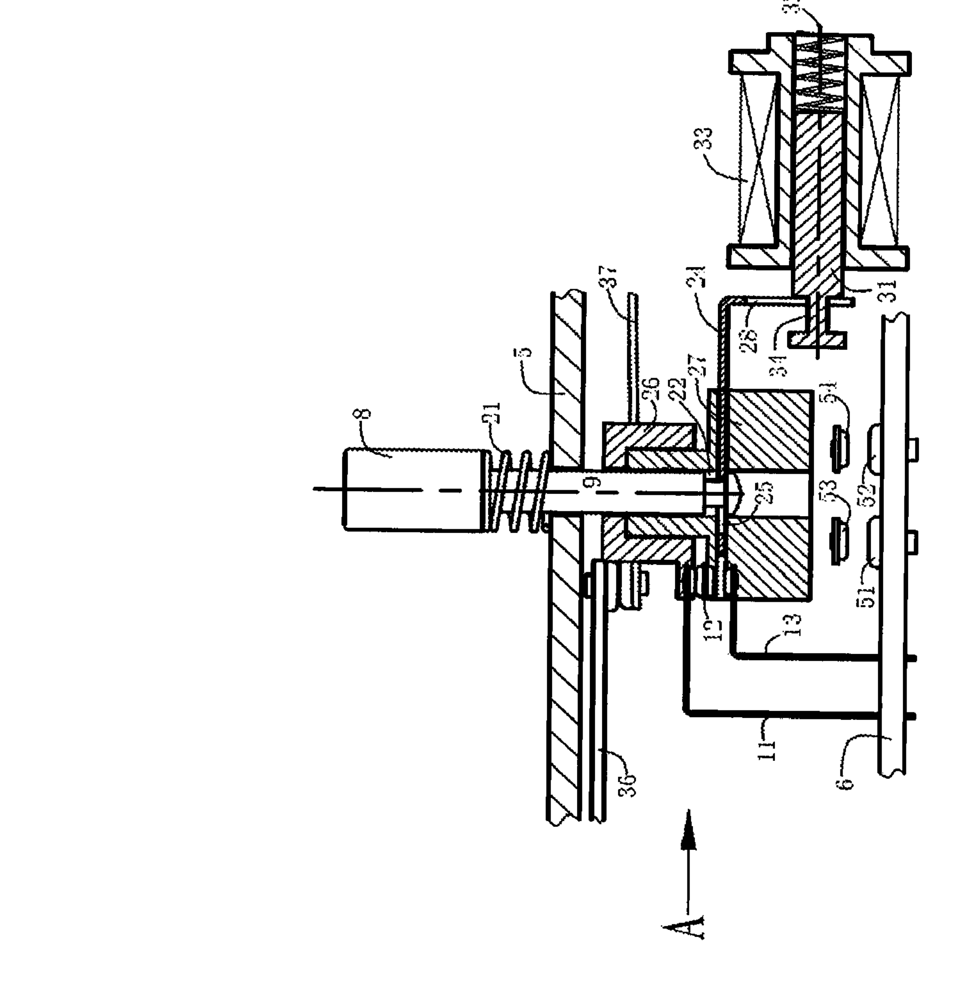

In the tripped state, if the input side of the GFCI is correctly connected to the line power and if the leakage current detection circuit is working properly, the GFCI can be reset by pressing and releasing the reset button as described below. When the reset button 8 is pressed down (see FIGS. 2A and 2B), the reset shaft 9 presses on the horizontal arm of the L-shaped locking member 24, pushing the disconnect member 27 down. The resilient metal plates 41, 42 are pressed downward, so that the switches SW1 and SW2 are closed. The silicon-control rectifier SCR1 becomes conductive, and a sufficiently large current flows through the coil 33 (the SOL). The plunger 31 is moved by the magnetic force of the coil 33, causing the L-shaped locking member 24 to move with it so that the hole 25 on the L-shaped locking member 24 moves to the position aligned with the lower end of the reset shaft 9. As a result, the reset shaft 9 passes through the hole 25, and a neck portion 22 of the reset shaft 9 mechanically engaged with the locking member 24 at the edge of the hole 25 (refer to FIG. 3B). At this time (see FIGS. 3A and 3B), when the user releases the push on the reset button, the reset button 8 and the reset shaft 9 are urged upwards by the reset spring 21, and the disconnect member 27 moves upwards with them due to the engagement of the reset shaft 9 and the L-shaped locking member 24. This is the reset state (FIGS. 3A and 3B). In this state, switches SW1 and SW2 become open. Contact terminals 57 and 58 are in contact, i.e., the points 1 and 2 of switch SW3 are connected (see FIG. 4), so that the simulated leakage current path that includes the primary stage of the IC2 is broken. Also, in the reset state, the input-side conductors 36, insertion output conductors 38 and output-side conductors 37 are electrically connected by the reset switches (contact terminals 61 to 64 and 66 to 69), bringing power to the output end and the plug end of the GFCI.

The tripping action of the GFCI device of the first embodiment is similar to that in a conventional GFCI device. When the GFCI is in the reset state (see FIGS. 3A and 3B), and the leakage current detection circuit including RING1 and IC1 detects a leakage current in the electric lines, a trigger signal on pin 5 of IC1 causes SCR1 to become conductive. The solenoid SOL is energized, and the plunger 31 moves the L-shaped lock member 24 so that the neck portion 22 of the rest shaft is disengaged from and the L-shaped lock member 24. As a result, the lifting block 26 and the disconnect member 27 fall down, opening the reset switches.

In the circuit shown in FIG. 4, the anode of the first SCR (SCR1) is biased by a first branch that includes the resistor R4. The anode of SCR1 is also connected via the selection switch SW3 to a second branch in parallel with the first branch. When the selection switch SW3 connects the anode of SCR1 to the second branch (note that this state is not shown in FIG. 4), the selection switch SW3 also disconnects the anode of SCR1 from the first control circuit (the primary stage of the photo coupler IC2). In this state, the circuit condition detection and control circuit is disabled; meanwhile the input side and output side as well as the insertion output of the GFCI are connected to provide power normally. Further, in this state, if a leakage current is detected, the SCR1 is triggered to become conductive, and a sufficient current will flow through the electro-magnetic disconnect mechanism, causing the GFCI to trip.

In conventional GFCI devices with reverse wiring protection function, when the GFCI is in the initial tripped state and the reset button is pressed to reset it, a sufficiently large current must flow through the solenoid to activate the electromagnetic disconnect mechanism, yet a large current can only flow during half of the periods of the AC current. In the GFCI device according to the first embodiment of the present invention (see FIG. 4), a large current can flow through the solenoid SOL during both halves of the AC period. This is accomplished by switches SW1 and SW2. These two switches provide a DC bias voltage across the anode and control gate of SCR1, so that SCR1 is continuously conductive during both halves of the AC period. Alternatively (not shown), the switch set including two switches SW1 and SW2 can be replaced by one switch (i.e. a switch set including one switch), and a branch circuit is added across the anode and control gate of SCR1 to provide the DC bias. In this alternative, to prevent SCR1 from accidentally becoming conductive, a one-directional conducting device (e.g. a diode) is provided between the anode of SCR1 and the single switch.

The second embodiment of the present invention is described with reference to FIGS. 5A-7.

As shown in these figures, a pair of input-side conductors 136 is disposed below a frame 105 and is provided with contact terminals 167, 168 thereon. A pair of insertion output conductors 138 are disposed adjacent the pair of input-side conductors 136 and are provided with contact terminals 166, 169 thereon. A pair of output-side conductors 137 is disposed below the input-side conductors 136 and the insertion conductors 138 and is provided with contact terminals 161, 162, 163 and 164 thereon. The contact terminals 161, 162, 163 and 164 correspond in position with contact terminals 166, 167, 168 and 169, respectively. The contact terminals 161 and 162 are electrically connected; the contact terminals 163 and 164 are electrically connected. These contact terminals constitute the reset switches shown in FIG. 7.

A reset button 108 is disposed above the frame 105. A reset shaft 109 is mechanically coupled to the reset button 108, and passes through the frame 105. The lower end of the reset shaft 109 has a neck portion 122 and a cone shaped tip 110. A reset spring 121 is disposed around the reset shaft 109 between the frame 105 and the reset button 108. A disconnect member 126 is disposed below the frame 105 and can lift the pair of output-side conductors 137. The disconnect member 126 has a center through hole through which the reset shaft 109 passes.

On the side of the disconnect member 126 are three conductors 111, 112 and 113 electrically connected to a circuit board 106. A contact terminal 158, a double-sided contact terminal 157 and a contact terminal 156 are provided at the end of the conductors 111, 112 and 113, respectively. The contact terminals 158, 157 and 156 are aligned in the vertical direction, with the contact terminal 158 at the top, the contact terminal 157 in the middle, and the contact terminal 156 at the bottom. These three contact terminals 158, 157 and 156 constitute the selection switch SW1 shown in FIG. 7. The horizontal arm of the conductor 112 is clamped between two horizontal protrusions of the disconnect member 126 and moves with them. Contact terminals 157 and 156 are in contact when the GFCI is in the tripped (disconnected) state. When the disconnect member 126 is lifted, the conductor 112 is lifted to connect the contact terminals 157 and 158 with each other while disconnecting the contact terminals 157 and 156 from each other.

Inserted in the disconnect member 126 is an L-shaped locking member 124 which has a horizontal arm inserted through the disconnect member 126. The horizontal arm of the L-shaped locking member 124 has a hole 125, and the L-shaped locking member 124 can move horizontally between a position where the hole 125 is aligned with the center through hole of the disconnect member 126 and a position where the hole 125 is not aligned with the center through hole of the disconnect member 126.

Disposed on one side of the L-shaped locking member 124 is a disconnect assembly which includes a coil 133 (corresponding to the solenoid SOL in FIG. 7), a disconnect spring 132 and a plunger (or core) 131. One end of the plunger 131 is mechanically coupled to the disconnect spring 132, and the spring 132 and the plunger 131 are disposed within the coil 133. Another end of the plunger has a neck portion 134 mechanically coupled to a hole or slot 128 on the vertical arm of the L-shaped locking member 124. When a sufficiently large current flows through the coil 133, the plunger 131 is moved horizontally by the magnetic force generated by the coil 133, thereby moving the L-shaped locking member 124 correspondingly. On the other side of the L-shaped lock member 124 is a coil 143, a spring 142, a plunger 141, and a blocking plate 144 coupled to the plunger 141. The coil 43 corresponds to the relay RELAY in FIG. 7. The coil 143, spring 142, plunger 141 and blocking plate 144 form a reset control mechanism.

The reset button 108, reset shaft 109 and reset spring 121 form a reset mechanism. The disconnect assembly (coil 133, spring 132 and plunger 131), the disconnect member 126, the L-shaped locking member 124 and the SCR1 form an electromagnetic disconnect mechanism which cooperate with other parts of the GFCI device to trip (disconnect) and reset (connect) the GFCI device as described in more detail below.

Still referring to FIGS. 5A-7, in the disconnected (tripped) state, the input-side conductors 136, the insertion output conductors 138 and the output-side conductors 137 are electrically disconnected from each other. During installation, if the line power is connected to the output side of the GFCI by mistake, the coil 143 is not energized because it is connected to the input end of the GFCI, and the plunger 141 does not move. Thus, the L-shaped locking member 124 is clamped between the blocking plate 144 and the plunger 131, and kept by the forces of the two springs 142 and 132 at a position where the hole 125 of the L-shaped lock member 124 is aligned with the center through hole of the disconnect member 126 (refer to FIG. 5B). Therefore, the reset shaft 109 can move freely up and down through the hole 125 without engaging the locking member 124, and cannot bring the disconnect member 126 up with it. This disables the reset mechanism. As a result, the contact terminals 161-164 and 166-169 do not contact each other and no power is outputted to the input side and the insertion output (the plug). This accomplishes the reverse-wiring protection function.

Figure 7:
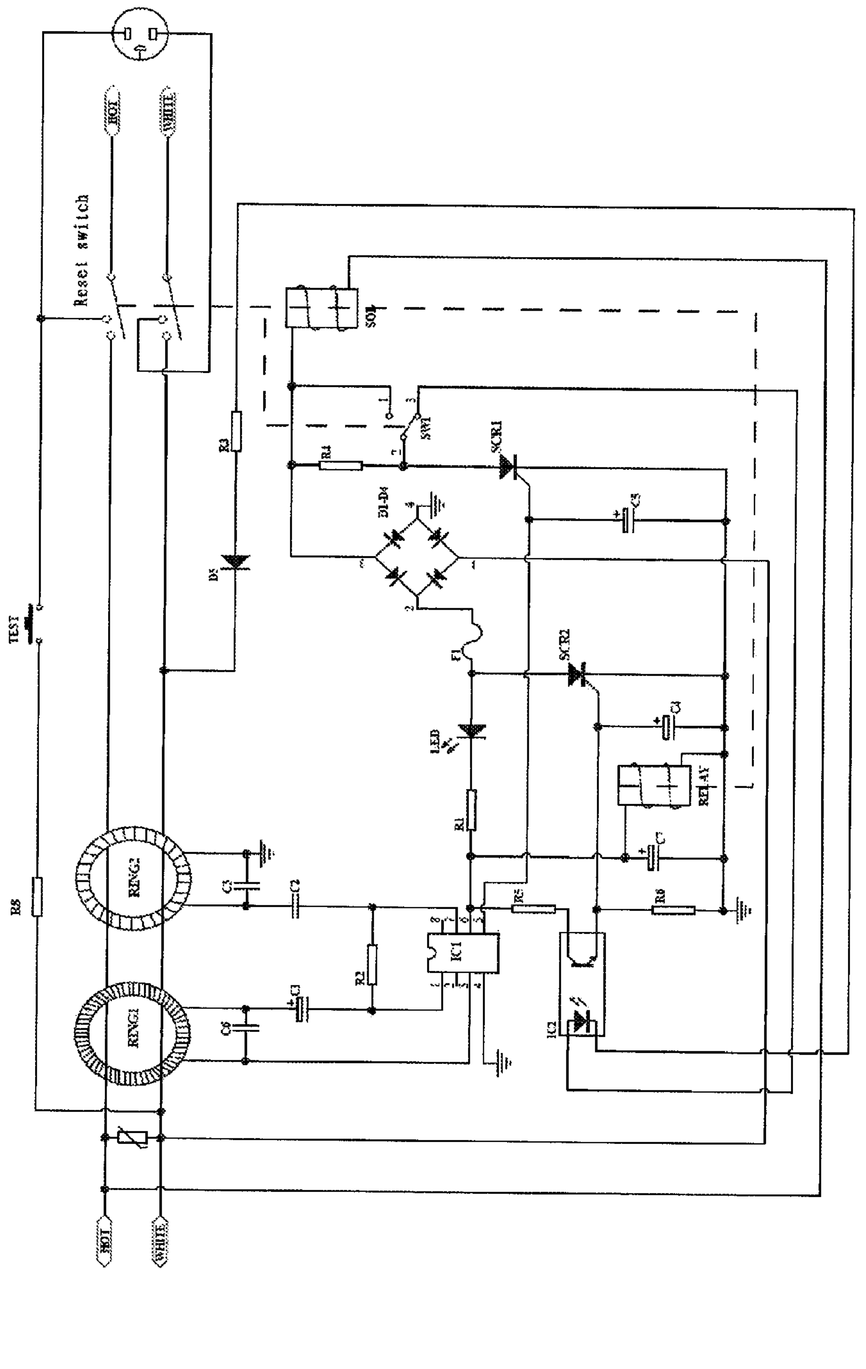
FIG. 7 is a circuit diagram of the GFCI device according to the second embodiment of the present invention.

In the circuit diagram shown in FIG. 7, a circuit condition detection and control circuit includes a first control circuit which includes a photo coupler IC2 and a second control circuit which includes a silicon-control rectifier SCR2.

When the input side of the GFCI is correctly connected to the line power and the input-side conductors 136 are disconnected from the insertion output conductors 138 and the output-side conductors 137 (i.e. a tripped state), the GFCI operates as follows. In this state, the light emitting diode LED emits light. Contact terminals 156 and 157 are in electrical contact, i.e., points 2 and 3 of the switch SW3 are connected. Thus, the solenoid SOL, resistor R4, switch SW3, the primary stage of the photo coupler IC2 (i.e. the light emitting side of the photo coupler), resistor R3 and diode D5 form a current path between the hot and white terminals on the input side. The current in this current path (hereinafter referred to as the simulated leakage current path) generates a simulated leakage current for the detector ring RING1, which detects this leakage current and provides an input signal to the integrated circuit IC1, causing IC1 to output a trigger signal at its pin 5. This trigger signal is applied to the gate of the silicon-controlled rectifier SCR1 and triggers the SCR1 to become conductive, which shorts the simulated leakage current (by shorting point 2 to ground). As the simulated leakage current for the detector ring RING1 is no longer present, IC1 stops generating the output trigger signal at pin 5, and SCR1 becomes non-conductive. At this time, the simulated leakage current path is again formed by the solenoid SOL, resistor R4, switch SW3, the primary stage of the photo coupler IC2, resistor R3 and diode D5. As such, the above-described actions are repeated with the alternating cycle of the AC current. When the primary stage (the light emitting element) of the photo coupler IC2 has intermittent current flow through it in the manner described above, the light emitting element emits light intermittently, and the secondary stage of the photo coupler IC2 (i.e. the photo sensitive element) is not activated and does not conduct. In this state, the GFCI is tripped and the leakage current detection circuit is working property, and the GFCI is ready to be reset at any time.

If, however, when in the tripped state the leakage current detection circuit including RING1 and IC1 malfunctions and cannot generate a proper trigger signal at pin 5, SCR1 will not conduct at all. As a result, the simulated leakage current path has a continuous current flow through it. As the primary stage of the photo coupler IC2 continuously emits light, the secondary stage of the photo coupler IC2 (the light sensitive element) is activated and becomes conductive. As a result, a trigger voltage is applied to the gate of the silicon-control rectifier SCR2, causing SCR2 to be conductive. This in turn causes the fuse Fl to be burnt out, and the light emitting diode LED no longer emits light. This is the end of life state of the GFCI. In this state, the circuit IC1 is no longer powered by the diode bridge D1-D4, and the GFCI cannot be reset.

Figure 6A:
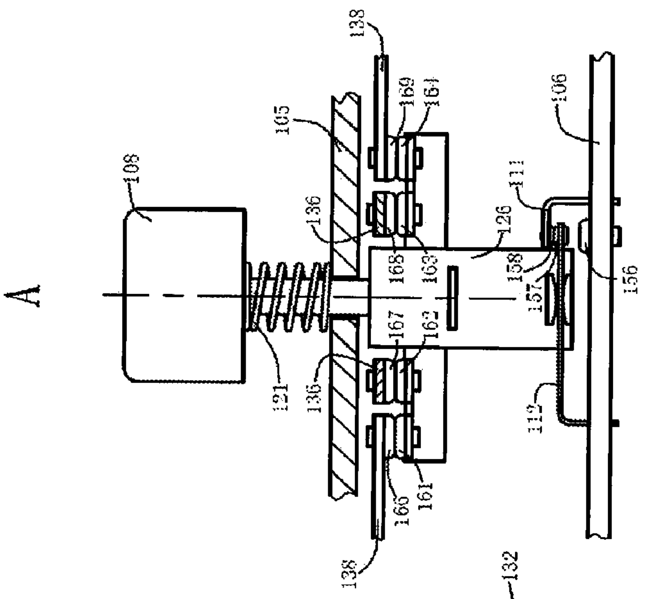
FIGS. 6A and 6B are two orthogonal cross-sectional views of the GFCI device according to the second embodiment of the present invention in a reset (connected) state.
Figure 6B:
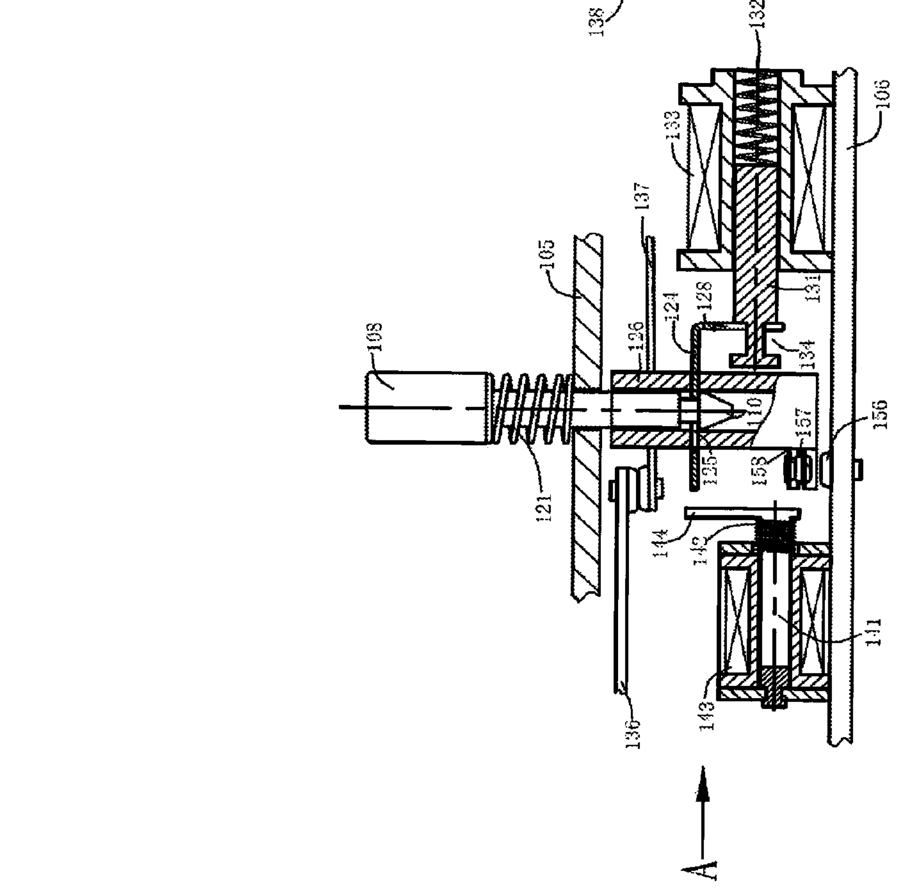

When the input side of the GFCI is correctly connected to the line power during installation, the coil 143 is energized and the plunger 141 brings the blocking plate 144 away from L-shaped lock member 124. Thus, the L-shaped locking member 124 moves to a position where the edge of the hole 125 can engage the neck portion 122 of the reset shaft 109. The device is now correctly wired and in a tripped state. In this tripped state, if the leakage current detection circuit is working properly, the GFCI can be reset by pressing and releasing the reset button as described below. When the reset button 108 is pressed down, the cone shaped tip 110 of the reset shaft 109 passes through the hole 125, and the neck portion 122 engages the locking member 124 at the edge of the hole 125 (refer to FIG. 3B). When the user releases the push on the reset button, the reset button 108 and the reset shaft 109 are urged upwards by the reset spring 121, and the disconnect member 126 moves upwards with them due to the engagement of the reset shaft 109 and the L-shaped locking member 124. This is the reset state (FIGS. 6A and 6B). In this state, contact terminals 157 and 158 are in contact, i.e., the points 1 and 2 of switch SW3 are connected (see FIG. 7), so that the simulated leakage current path that includes the primary stage of the IC2 stops working. Also, in the reset state, the input-side conductors 136, insertion output conductors 138 and output-side conductors 137 are electrically connected by the reset switches (contact terminals 161 to 164 and 166 to 169), bringing power to the output end and the plug end of the GFCI.

The tripping action of the GFCI device of the second embodiment is similar to that in the first embodiment.

It will be apparent to those skilled in the art that various modification and variations can be made in the GFCI device of the present invention without departing from the spirit or scope of the invention. Thus, it is intended that the present invention cover modifications and variations that come within the scope of the appended claims and their equivalents.

What is claimed is:

1. A ground-fault circuit interrupter (GFCI) device, comprising:

a leakage current detection circuit;

a electro-magnetic disconnect mechanism including a first silicon-control rectifier (SCR), wherein the actuation of the electro-magnetic disconnect mechanism is controlled by the leakage current detection circuit;

a reset mechanism including a reset button, wherein the reset button is moveable between a first position and a second position, wherein when the reset button is in the second position, the leakage current detection circuit generates a signal to actuate the electro-magnetic disconnect mechanism to move the reset button to the first position;

a circuit condition detection and control circuit; and a selection switch, wherein circuit condition detection and control circuit includes a first control circuit and a second control circuit, the selection switch selectively electrically connecting the first control circuit to an anode of the first SCR, wherein when the selection switch electrically connects the first control circuit to the anode of the first SCR, the first control circuit provides a simulated leakage current to the leakage current detection circuit and the leakage current detection circuit provides a trigger signal to a control gate of the first SCR, wherein the first control circuit either generates the simulated leakage current intermittently or generates a first control signal for the second control circuit based the trigger signal, wherein the second control circuit generates a second control signal, a short circuit protection element operable to electrically disconnect a power to the leakage current detection circuit in response to the second control signal from the second control circuit;

a circuit condition indicator for indicating a condition of the short circuit protection element, whereby the circuit condition indicator indicates a working condition of the GFCI device;

a first branch circuit including a resistor connected to the anode of the first SCR for biasing the anode of the first SCR; and a second branch circuit selectively connected to the anode of the first SCR in parallel with the first branch circuit by the selection switch, wherein when the selection switch connects the anode of the first SCR to the second branch circuit, the selection switch disconnects the anode of the first SCR from the first control circuit, whereby the circuit condition detection and control circuit is disabled.

2. The GFCI device of claim 1, further comprising a switch set for connecting a DC bias voltage signal across the anode and the control gate of the first SCR.

3. The GFCI device of claim 1, further comprising a reset control mechanism, the reset mechanism being responsive to an input power applied to an input side of the GFCI for enabling or disabling the rest mechanism.

4. The GFCI device of claim 3, wherein the reset control mechanism includes a coil, a plunger disposed inside the coil, and a blocking plate mechanically coupled to the plunger.

5. The GFCI device of claim 1, wherein the short circuit protection element includes a fusible link.

6. The GFCI device of claim 1, wherein the circuit condition indicator includes a light emitting diode or a beeper.

* * * * *